Figure 1:
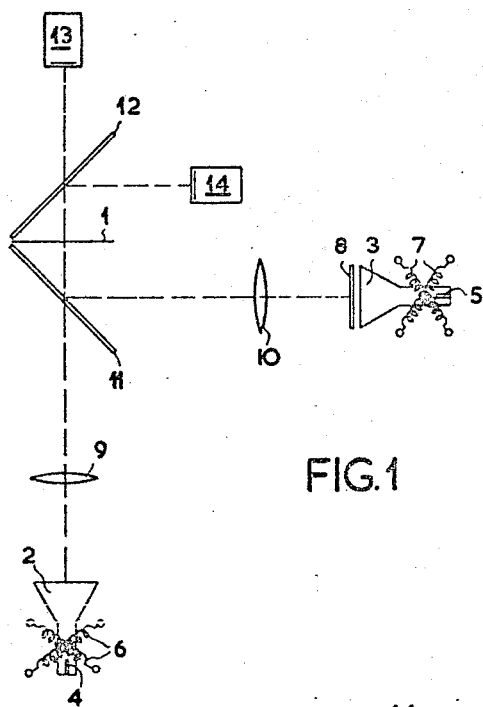

June 5, 1962  H. BRUINING  3,037,564
CAMERA
Filed June 9, 1959  2 Sheets-Sheet 1

INVENTOR
HAJO BRUINING

June 5, 1962 H. BRUINING 3,037,564
CAMERA
Filed June 9, 1959 2 Sheets-Sheet 2

INVENTOR
HAJO BRUINING
BY
AGENT

United States Patent Office 3,037,564
Patented June 5, 1962

3,037,564
CAMERA
Hajo Bruining, Eindhoven, Netherlands, assignor to North American Philips Company, Inc., New York, N.Y., a corporation of Delaware
Filed June 9, 1959, Ser. No. 819,067
Claims priority, application Netherlands June 17, 1958
4 Claims. (Cl. 178—7.1)

The invention relates to a camera device for producing simultaneously video signals of different scanning standards relating to the same object. Practice is often confronted with the problem of producing simultaneously video signals with different scanning standards for one and the same object. For example, on the one hand video signals of a scanning raster of 625 lines and on the other hand video signals of a scanning raster of 819 lines may be desired. Even the image frequency may be different for the two signals.

If the object is a living scene, use may be made, of course, of two or more different camera devices, the scanning beams of the different camera tubes writing different rasters. However, if the object is a film or a slide, this method is attended with difficulties, since then two or more specimens of the film or the slide must be available.

The invention has for its object to provide a device in which the latter requirement does not apply. However, the invention is not restricted to scanning with different standards a film or a slide, it may also be used when the object is a living scene.

The camera device according to the invention is characterized in that the object, as a light-pervious or light-reflecting medium, is located in the luminous paths of at least two light sources, each of which writes, under the action of suitable deflection means, a scanning pattern with relatively different standards and each of which produces light of relatively different nature and in that the light passing through the object or reflected thereby is converted into electrical signals by suitable elements, which have such properties or are equipped with such means that each of a number of elements at least equal to the number of scanning standards only responds to light of a given nature.

Kinds of light of different nature are to be understood to mean kinds of light of which the properties are such that, when one kind of light is added to another kind, these two kinds or light can be separated wholly or partly by suitable means. If the two kinds are located, for example, in different parts of the spectrum, they can be separated with the aid of optical filters. If the two kinds have different polarisations, they can be separated with the aid of polarizers.

The invention will be described more fully with reference to the figures of the drawing showing embodiments of devices according to the invention.

FIG. 1 shows a camera device according to the invention which is capable of producing video signals with two different scanning standards for a film or a slide 1. The moving mechanism required for a film is not shown in FIG. 1.

Reference numerals 2 and 3 designate cathode-ray tubes, on the phosphor screens of which are produced, in known manner, light spots, with the aid of electron beams produced in these tubes by the electron guns 4 and 5 respectively. Under the action of the deflecting means 6 and 7, shown diagrammatically, the light spots on the phosphor screens write two relatively different scanning rasters, of which the number of lines, the line frequency and so on are determined by the signals fed to the deflection means 6 and 7 respectively.

The light produced by the cathode-ray tube 2 has, in accordance with the invention, a nature differing from that produced by the cathode-ray tube 3. In the embodiment shown the two kinds of light are located in different parts of the spectrum. To this end the cathode-ray tube 2 is provided with a phosphor screen comprising a phosphor irradiating light in the violet (or ultra-violet) part of the spectrum, for example, a phosphor comprising Ca—Mg.silicotitanate or Ca—Al-silicate, activated with Ce, whereas the cathode-ray tube 3 has a phosphor screen comprising ZnO—Zn-phosphor, a filter 8 being arranged in front of this screen, the pass characteristic of this filter having a maximum in the green part of the spectrum.

With the aid of suitable lens systems, shown diagrammatically in the figure and designated by 9 and 10 respectively, and which the aid of a suitable colour-selective mirror 11, which allows violet light to pass, and which reflects green light, the light produced by the two cathode-ray tubes is projected onto the film or the slide 1. In accordance with the density of this film or slide the passing light is more or less attenuated. The emerging light consists of two components of different characters; one of these components consists of a violet light beam modulated in accordance with the said density and writing a scanning raster which is determined by the signals fed to the deflection means 6 of the cathode-ray tube 2; the other component consists of a green light beam, which is also modulated in accordance with the said density, but which writes a scanning pattern determined by the signals fed to the deflection means 7 of the cathode-ray tube 3.

This emerging light is projected onto the colour-selective mirror 12, which also passes, for example, the violet light and which reflects the green light. The passing violet light strikes the screen of a photosensitive element 13, so that the incident light is converted into electrical signals corresponding to the intensity of this light. The scanning standard of the signals thus obtained is determined only by the signals fed to the deflection means 6 of the cathode-ray tube 2.

The reflected green light strikes the screen of a photosensitive element 14, so that the incident light is also converted into electrical signals, of which the scanning standard is determined only by the signals fed to the deflection means 7 of the cathode-ray tube 3.

It should be noted that the mirror 11, which is a colour-selective mirror in the embodiment shown, may be replaced by a semi-permeable mirror. The advantage of a colour-selective mirror is that the absorption of the incident light is very small with respect to the absorption in the case of a semi-pervious mirror.

Similarly, the colour-selective mirror 12 may be replaced by a semi-permeable mirror. In this case, however, the photo-sensitive elements 13 and 14 must be provided with suitable optical filters, which are permeable only to green or to violet light, or the screens of the photo-sensitive elements 13 and 14 must have a structure such that these elements are sensitive only to green or to violet light.

The embodiment shown in FIG. 1 may be extended readily for the event in which, instead of producing two signals with different scanning standards, three signals of this kind are to be produced for the same object. The simple mirrors 11 and 12 may then be replaced by two sets of crossed mirrors and the kind of light produced by a third cathode-ray tube may lie in a part of the spectrum not occupied by one of the two others.

Instead of using two or more kinds of light that can be separated from one another, because they are lying in different parts of the spectrum, kinds of light may be used which can be separated on behalf of their different polarisations.

Figure 2:
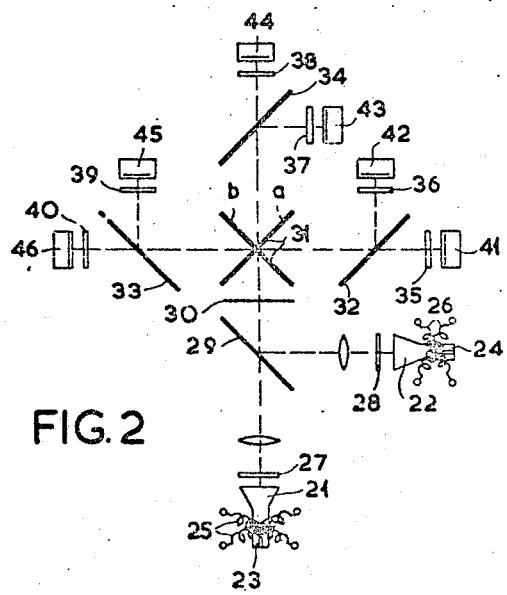

FIG. 2 shows diagrammatically an embodiment which is suitable for producing two colour television signals with different scanning standards, in which use is made of light species of different polarisations.

Reference numerals 21 and 22 of FIG. 2 designate cathode-ray tubes, of which the electron beams produced by the electron guns 23 and 24 respectively produce light spots on the phosphor screens, these luminous spots writing two different scanning patterns, of which the number of lines, the line frequency and so on are determined by the signals fed to the deflection means 25 and 26 respectively under the action of these deflection means.

The light produced by the two tubes is, in this case, white light. By means of suitable polarizers 27 and 28, it is ensured that the mixed light passing the semi-permeable mirror 29 has two relatively separable components.

In order to achieve a suitable separation, the polarizers may be adjusted so that, for example, the two components of the light emanating from the mirror 29 are polarized at right angles to each other. The light thus mixed, after having passed through the colour slide or the colour film 30, is split up into a red, a green and a blue component with the aid of the dichroic mirrors 31. Each of these components, however, consists of two components of different polarisations.

When assuming that the mirror $a$ of the set 31 reflects red light and that the mirror $b$ reflects blue light, the red component is projected onto the semi-permeable mirror which divides the incident light into a beam striking the screen of the photo-sensitive element 41 via the analyser 35 and into a beam which strikes the screen of the photo-sensitive element 42 via the analyser 36. The analyser 35 is chosen so that only light with a polarisation direction corresponding to the polarizer 27 is passed; the analyser 36, however, is adjusted so that only light with a polarisation direction corresponding to the polarizer 28 is passed. Consequently, the photosensitive element 41 can supply a signal which relates to the red light components of the slide or the film 30, the scanning standard thereof being determined by the deflection signals fed to the deflection means 25 of the cathode-ray tube 21. Similarly, the photo-sensitive element 42 can produce a signal which also relates to the red light components of the slide or the film 30, its scanning standard being, however, determined by the deflection signals fed to the deflection means 26 of the cathode-ray tube 22.

The blue component of the light entering the set 31 is projected onto the semi-permeable mirror 33; the green component of this light is projected onto the semi-permeable mirror 34. The two mirrors divide the incident light again into two beams: the blue beams strike the screens of the photosensitive elements 45 and 46 via analysers 39 and 40; the green beams strike the screens of the photo-sensitive elements 43 and 44 via the analysers 37 and 38. The analysers 37 and 39 are chosen so that only light with a polarisation direction corresponding to the polariser 27 is passed; the analysers 38 and 40 are adjusted so that only light with a polarisation direction corresponding to the polarizer 28 is passed.

Consequently, the photo-sensitive elements 43 and 45 can produce signals relating to the green and blue light components respectively of the object 30, the scanning standards being determined by the deflection signals fed to the deflection means 25 of the cathode-ray tube 21; the photo-sensitive elements 44 and 46 can produce signals also relating to the green and the blue light components respectively of the object 30, the scanning standards being determined by the deflection signals fed to the deflection means 26 of the cathode-ray tube 22.

The output signals of the photo-sensitive elements 41, 43 and 45 can then be composed to form the colour television signal relating to the object with a scanning standard which is equal to that of the cathode-ray tube 21 and the output signals of the photo-sensitive elements 42, 44 and 46 can be composed to form one colour television signal relating to the same object, having, however, a scanning standard which is equal to that of the cathode-ray tube 22.

It should be noted that, instead of first splitting up the light beam passing through the object into light beams of different colours and instead of subsequently splitting up each of the light beams thus obtained into light beams with different polarisation directions, the light beam passing through the object may be first split up into light beams with different polarisation directions, after which the light beams thus obtained are each split up into light beams of different colours.

Figure 3:
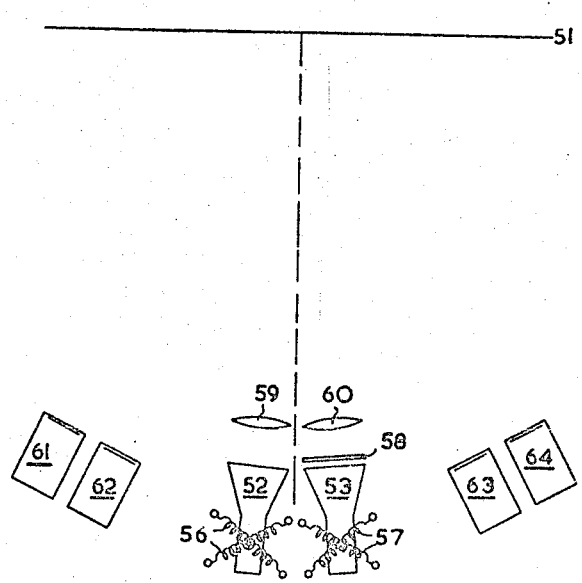

FIG. 3 shows finally a camera device according to the invention, by which video signals with two different scanning standards are produced relating to one object 51, which may be a living scene.

Reference numerals 52 and 53 designate cathode-ray tubes, of which the luminous spots produced on the phosphor screens, under the action of the deflection signals fed to the deflection means 56 and 57 respectively, write two relatively different scanning rasters.

The cathode-ray tube 52 is provided, for example, as before, with a phosphor screen containing a phosphor irradiating light in the violet part of the spectrum, whereas the cathode-ray tube 53 has a phosphor screen containing ZnO—Zn phosphorus, a filter 58, the pass characteristic of which has a maximum in the green part of the spectrum, being arranged in front of the said screen.

The light produced by the two cathode-ray tubes is projected, with the aid of suitable lens systems, shown diagrammatically in the figure and designated by 59 and 60, onto the object 51. The light reflected by this object is captured by the photo-sensitive elements 61, 62, 63 and 64. When it is assumed that the photo-sensitive elements 61, and 63 are only sensitive to violet light, emanating from the cathode-ray tube 52, the output terminal of these elements has produced at it a television signal, of which the scanning standard is determined by the deflection signals fed to the deflection means 56 of the cathode-ray tube 52. The signals thus obtained in the output circuits of these elements 61 and 63 may be combined.

The photo-sensitive elements 62 and 64 are assumed to be sensitive only to green light, emitted by the cathode-ray tube 53. Consequently, at the outputs of the elements 62 and 64 occurs a television signal, of which the scanning standard is determined by the signals fed to the deflection means 57 of the tube 53. Also the signals thus obtained may be combined.

If the photo-sensitive elements 61, 62, 63 and 64 are sensitive to white light, suitably chosen optical filters may be arranged in the light path of the light reflected by the object so that the elements 61 and 63 receive only light from the cathode-ray tube 52 and that the elements 62 and 64 receive only light from the cathode-ray tube 53.

It should be noted that the light emanating from the cathode-ray tube 52 and the light emanating from the cathode-ray tube 53 may be composed, in the manner referred to with the embodiment shown in FIG. 1, with the aid of semi-permeable or dichroic mirrors, to form a single beam. Thus the images produced by the two aforesaid video signals in suitable receivers are substantially identical.

In general it should be noted that, if the light species used in accordance with the invention cannot be completely split up optically, for example, because, if the various kinds are lying in different parts of the spectrum, these parts of the spectrum overlap each other and/or if the pass characteristics of the optical filters overlap each other, a suitable combination of the output signals of the various photo-sensitive elements can produce this complete separation electrically. If, for example, when producing two signals with different scanning standards, the desired signal with one scanning standard is $S_1$ and the desired signal with the other scanning standard is $S_2$, and the output signal of one photosensitive element is $a_{11}S_1+a_{12}S_2$ and the output signal of the other photosensitive element is $a_{21}S_1+a_{22}S_2$, the linear combination of $a_{11}S_1+a_{12}S_2$ and $a_{21}S_1+a_{22}S_2$, as will be evident, can produce the desired signals $S_1$ and $S_2$.

What is claimed is:

1. A television apparatus for simultaneously producing a plurality of video signals having different scanning standards and relating to the same object, comprising means directing a plurality of beams of light toward said object, means simultaneously scanning said beams with respect to said object according to different scanning standards, said beams of light from each of said plurality of directing means being of a different character, and a plurality of light sensitive means positioned to receive said light from said object for converting the light received thereby into a plurality of separate signals, said receiving means being sensitive to light of different characters.

2. A television apparatus for simultaneously producing a pair of video signals of different scanning standards and relating to the same object, comprising first means directing a first beam of light toward said object, second means for directing a second beam of light toward said object, said first and second beams having different non-overlapping spectral ranges, means simultaneously scanning said beams with respect to said object according to different scanning standards, and first and second light sensitive means positioned to receive light from said object for converting received light into first and second electrical signals respectively, said first and second light sensitive means being sensitive to light of the spectral range of a different beam.

3. A television apparatus for simultaneously producing a pair of video signals of different scanning standards and relating to the same object, comprising first means directing a first beam of light toward said object, second means for directing a second beam of light toward said object, said first and second beams having different polarizations, means simultaneously scanning said beams with respect to said object according to different scanning standards, and first and second light sensitive means positioned to receive light from said object for converting said light into first and second electrical signals respectively, said first and second light sensitive means each being sensitive to light of only one of said polarizations.

4. The apparatus of claim 3, comprising means for splitting up light received from said object into at least two spectral ranges.

References Cited in the file of this patent

UNITED STATES PATENTS

| | | |
|---|---|---|
| 2,520,507 | Marcy | Aug. 29, 1950 |
| 2,586,635 | Fernsler | Feb. 19, 1952 |
| 2,753,395 | Lawrence | July 3, 1956 |
| 2,797,256 | Millspaugh | June 25, 1957 |
| 2,817,265 | Covely | Dec. 24, 1957 |
| 2,937,234 | Whitehead | May 17, 1960 |
| 2,976,358 | Haines | Mar. 21, 1961 |

FOREIGN PATENTS

| | | |
|---|---|---|
| 657,411 | France | May 22, 1929 |
| 629,174 | Great Britain | Sept. 14, 1949 |
| 1,098,671 | France | Aug. 17, 1955 |
| 24,350/29 | Australia | Dec. 24, 1959 |